Dec. 20, 1960  E. B. TOLMAN  2,965,417
APPARATUS FOR FEEDING PULVERULENT MATERIAL
Filed Jan. 20, 1960  3 Sheets-Sheet 1
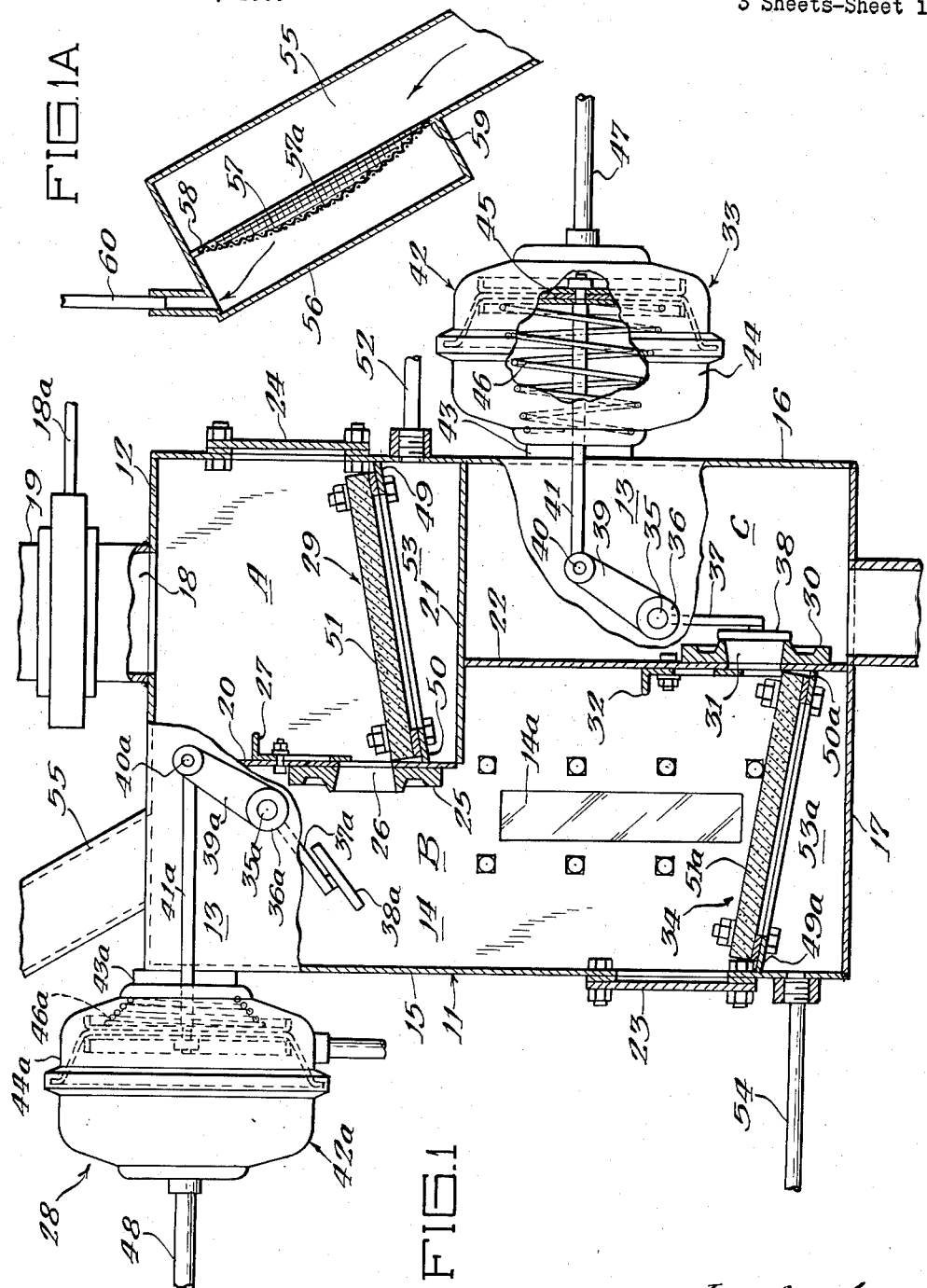
Inventor:
Edgar B. Tolman
By: Hofgren, Brady, Wegner,
Allen & Stellman
Attorneys

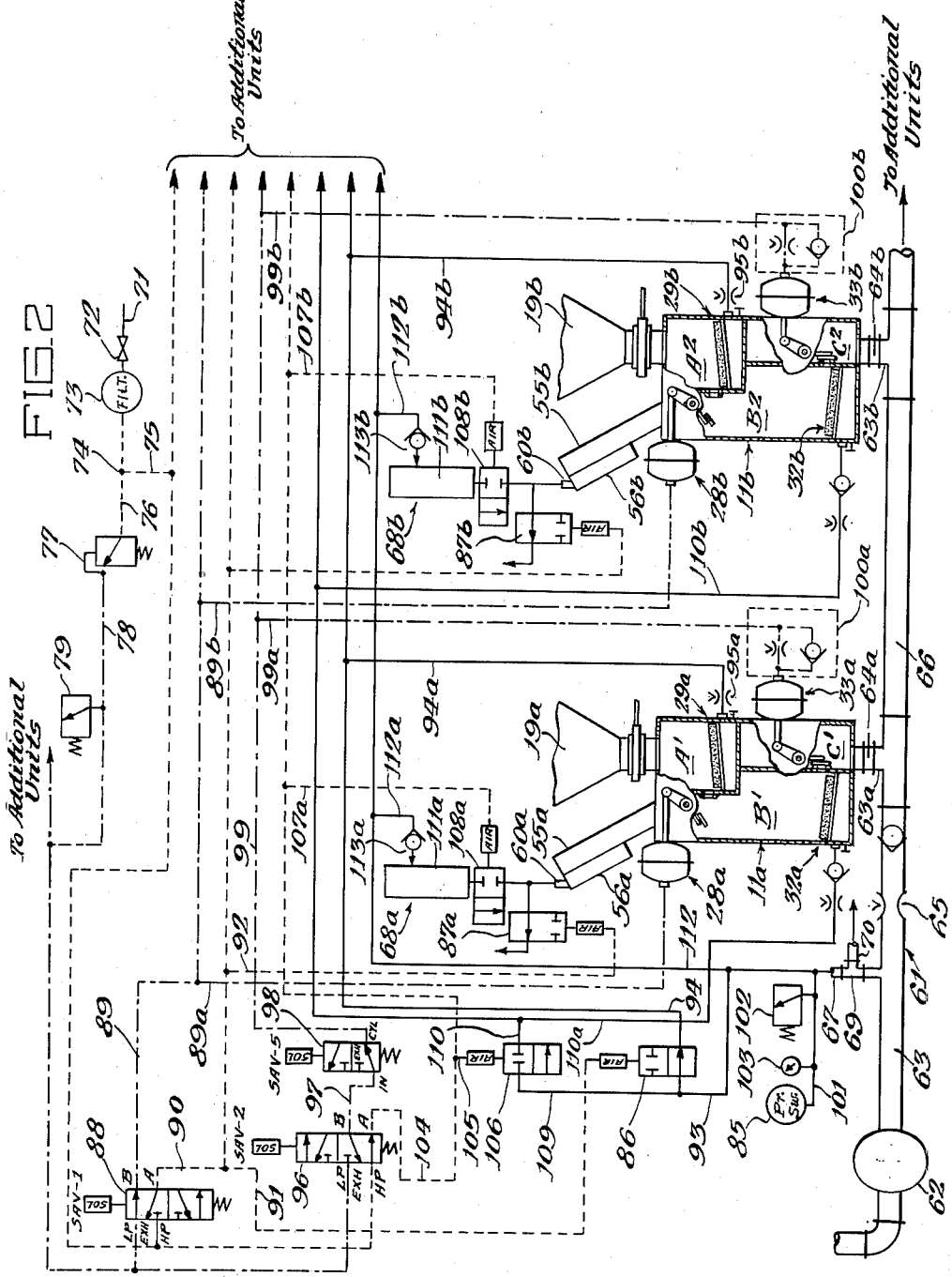

Dec. 20, 1960  E. B. TOLMAN  2,965,417
APPARATUS FOR FEEDING PULVERULENT MATERIAL
Filed Jan. 20, 1960  3 Sheets-Sheet 3

Inventor:
Edgar B. Tolman
By: Hofgren, Brady, Wegner,
Allen & Stellman
Attorneys United States Patent Office 2,965,417
Patented Dec. 20, 1960

2,965,417
APPARATUS FOR FEEDING PULVERULENT MATERIAL

Edgar B. Tolman, Winnetka, Ill., assignor to United Conveyor Corporation, a corporation of Illinois Filed Jan. 20, 1960, Ser. No. 3,647

16 Claims. (Cl. 302—17)

This invention relates to apparatus for feeding pulverulent material, and in particular it relates to apparatus for feeding such material from a collector which is at a predetermined internal pressure to a receiver which is at a higher internal pressure. This application is a continuation-in-part of my copending application 698,629, filed November 25, 1957, now abandoned.

The collector may be at atmospheric pressure, or below or above such pressure. The receiver is always at a pressure above the collector; and may be either a pressure pneumatic conveyor system or a storage bin at atmospheric pressure which is fed from a vacuum receiver.

The operation of high capacity electric power generating plants using coal burning boilers produces a very large volume of fine ash which must be transported and stored for suitable disposition. The ash may be collected mechanically or in electrostatic precipitators and then deposited in hoppers or collectors. In other instances it may be handled in a vacuum conveyor system, and separated from the transporting air current in a conventional cyclone separator. In either case, the ultimate disposition of the ash requires that it be transferred to a storage bin which is at atmospheric pressure, and from which it may be hauled away for disposal; or if the furnace is of the correct type the fly ash may be blown into the furnace by a pressure pneumatic conveyor, and the ash thereupon melts and flows out of the bottom of the furnace as molten slag. Obviously such slag, when solidified and disintegrated, is far easier to handle than the very fine dust and ash.

In any event, there is always a stage in the handling of the ash at which it must be transferred from a collecting device into receiving means which is at a higher pressure than the collecting device. This, of course, requires an airlock structure; and the peculiar nature of the material being handled places very special requirements upon the airlock chamber construction.

Furthermore, any satisfactory ash handling system, particularly one which involves the use of a pressure pneumatic conveyor, requires that the flow of ash shall be at a rather uniform rate, and in the case of a pneumatic conveyor requires that the conveyor not become choked by an excessive fall of ash due to uneven feeding.

It is also necessary in the operation of a feeder for pulverulent material to prevent any of the material from being vented to the asmosphere. An airlock chamber which is to feed between two zones at different pressures must be periodically vented so that its internal pressure is no greater than that of the collector from which it is to receive the material, and if it is to be discharged into a zone of positive pressure its internal pressure must be periodically elevated at least to equal that of the positive pressure zone into which it feeds. Further, if the ash is aerated to facilitate its flow into the airlock, the lock must be vented to get rid of the excess air. In any case the airlock chamber must be cyclically vented, and the very fine material with which the chamber is charged presents peculiar problems of filter cleaning and maintenance which are solved in the present apparatus.

The present apparatus also solves the problems of obtaining relatively even feed of material into and out of the airlock chamber, without choking the chamber or choking a pressure pneumatic feeder into which the chamber empties.

The invention is illustrated in a preferred embodiment in the accompanying drawings in which:

Fig. 1 is a central vertical sectional view of an airlock chamber which is part of the present apparatus, parts of the chamber being shown in side elevation;

Fig. 1a is a central vertical sectional view of a vent duct and filter chamber for the airlock;

Fig. 2 illustrates a pneumatic circuit suitable for the cyclic operation of two or more airlock feeders of the type illustrated in Fig. 1.

Figures 3, 4:
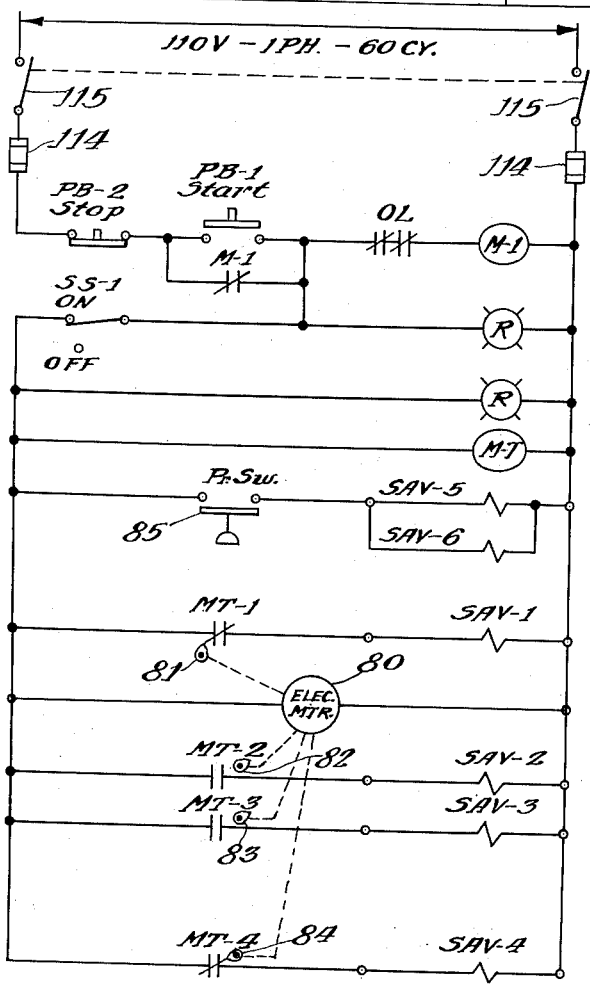
Fig. 3 is an across the line wiring diagram of the electric controls for the system of Fig. 2.
Fig. 4 is a timer schedule for the electrical system illustrated in Fig. 3.

Referring to the drawings in greater detail, and referring first to Figs. 1 and 1a, an airlock unit, indicated generally at 11, has a substantially rectangular housing formed by a top wall 12, front and back walls 13 and 14, side walls 15 and 16, and a bottom wall 17. Top wall 12 has an opening 18 connecting with the lower end of a collector 19 which, in the particular embodiment illustrated in Fig. 2, is a hopper-like device at atmospheric pressure. A slide gate 18a is provided to isolate airlock chamber 11 from collector 19.

An interior upright partition 20, which extends from front to rear of the housing, cooperates with a transverse partition 21 to define an inlet compartment A in the upper right hand corner of the unit 11 as seen in Fig. 1; while an upright partition 22 cooperates with the partitions 20 and 21 to define an airlock chamber B, occupying the entire left side of the unit 11, and with partition 21 to define an outlet compartment C below the inlet compartment A. A window 14a in back wall 14 permits inspection of chamber B in operation; and suitable access ports 23 and 24 are also provided.

Partition 20 which separates inlet compartment A from airlock chamber B has an opening in which is mounted a valve seat 25 which provides an inlet orifice 26 of small size through which airlock chamber B communicates with inlet compartment A and thus directly with collector 19. A vertically adjustable slide member 27 on partition 20 permits adjustment of the size of inlet orifice 26; and the opening and closing of said orifice is controlled by automatic valve means, indicated generally at 28. Flow of material from inlet compartment A into airlock chamber B is facilitated by aerating means, indicated generally at 29, which is located in compartment A to fluidize pulverulent material in the compartment so that it will flow freely through the restricted inlet orifice 26.

Interior partition 22 which separates airlock chamber B from outfeed compartment C also has an opening in which is mounted a valve seat 30 which provides an outlet orifice 31 of restricted size by means of which airlock chamber B communicates with outlet compartment C. An adjustable slide member 32 may be used to adjust the size of outfeed orifice 31; and the opening and closing of said orifice is provided by automatic valve means, indicated generally at 33. Aerating means, indicated generally at 34, is positioned in the lower end of airlock chamber B to facilitate the flow of material through outfeed orifice 31.

As previously pointed out, a very important factor in the successful operation of the present device is that the ash is fed at a controlled rate into and out of airlock chamber B. This is accomplished by the combination of an aerator with a valve controlled opening which passes the material only at a relatively slow and controlled rate. By providing a time cycle control for operating the aerator 29 and valve 28, and also for operating the aerator 34 and valve 33, a steady, metered flow of ash into airlock chamber B and subsequently out of airlock B is achieved.

It has been determined that thoroughly aerated ash or similar pulverulent material will flow through an orifice in a vertical wall at a rate which is proportional to the area of the orifice opening, and the rate is affected very little by the head of material above the opening. The rate of discharge through the opening is about one half a cubic foot per minute per square inch of orifice opening.

Thus, an airlock chamber having an inlet orifice 26 and an outlet orifice 31 each of which is 2½ inches in diameter, or 4.9 square inches in area, will fill and empty at the rate of 2½ cubic feet per minute. By setting up a suitable timing cycle with automatic valve controls, a completely controlled flow of ash into a pressure feeder may be effected. If a full cycle of one minute is employed, up to 25 seconds may be used for loading airlock chamber B, five seconds for valve operation, and 30 seconds for discharging from chamber B into the receiving means. With such a timing cycle, an airlock feeder will handle about one cubic foot per minute; and with two feeders used on alternate cycles, the continuous discharge is about two cubic feet per minute.

Referring again to Fig. 1, automatic valve mechanisms 28 and 33 are identical in construction, so only the mechanism 33 will be described in detail, and similar reference numerals will be applied to the parts of the two valve mechanisms. A shaft 35 journalled in a bushing 36 in front wall 13 has a valve arm 37 carrying a valve member 38 which bears upon valve seat 30 when outfeed valve 33 is closed. A crank arm 39 on shaft 35 adjacent the outer surface of front wall 13 has a cross pin 40 to which is pivotally secured a plunger 41 of a pneumatic power unit, indicated generally at 42. Unit 42 is mounted upon a bracket 43, and consists of a power chamber 44 within which is a pressure diaphragm 45; and a coil spring 46 bearing upon the diaphragm and on the end of power chamber 44 retains the parts in the position illustrated in Fig. 1, with valve member 38 seated upon valve seat 30 to close outfeed orifice 31. Admission of operating air to power chamber 44 through an air control line 47 acts upon pressure sensitive diaphragm 45 to move plunger 41 to the left as seen in Fig. 1, and thus open outfeed orifice 31.

Valve operating mechanism for valve means 28 is indicated generally at 42a, and the identical elements of said valve mechanism are numbered the same as those for valve means 33 with a reference letter "a" appended to each reference numeral, except that the air control line for power unit 42a is designated by reference number 48.

Aerating means 29 of compartment A has upper and lower brackets 49 and 50 which support a porous filter stone 51 of conventional type in an inclined position with its top surface aligned with the lower edge of inlet orifice 26. An aerating air pipe 52 is provided for admission of aerating air to a plenum 53 beneath stone 51. Similarly, aerating means 34 at the bottom of chamber B has brackets 49a and 50a supporting a porous stone 51a in an inclined position with its lower margin flush with the bottom of outfeed orifice 31; and an aerating air pipe 54 supplies air to a plenum 53a beneath stone 51a.

It has previously been stated that air must be vented from airlock chamber B, and for this purpose a vent duct 55 is provided which extends outwardly from the top of the chamber. Duct 55 expands into a rectangular filter chamber 56, and a fabric filter element 57 has its entire margin 58 sealed to a flange 59 which extends around filter compartment 56. As seen in Fig. 1a, the central portion 57a of filter 57 has a fullness, so that the fabric may assume the position shown in the drawing when air is being vented from airlock chamber B, and may swing loosely to an oppositely distended position when air is blown into airlock chamber B through an air pipe 60 which serves both to vent the chamber and to admit air to the chamber at certain times in the operating cycle.

Referring now to Fig. 2, there is illustrated a system in which two of the airlock feeders of the character illustrated in Figs. 1 and 1a are used to feed a pressure pneumatic conveyor. In actual practice, there may be several sets of feeding devices, with two feeding devices in each set, and as illustrated diagrammatically in Fig. 2 all of the air lines required for control of the two illustrated feeders, as well as the pressure pneumatic conveyor, extend onwardly as indicated by the arrows, so as to handle the control of additional groups of two feeding units. Accordingly, it is understood that the two airlock feeders 11a and 11b, which are seen in Fig. 2 to be feeding into a pressure pneumatic conveyor system, indicated generally at 61, may be duplicated so that when the feeders 11a and 11b are filling their airlock chambers, as seen in Fig. 2, other feeders may be discharging from the airlock chamber into the pressure pneumatic conveyor system.

Pneumatic conveyor system 61 includes a blower 62, and a conveyor duct 63 which is connected to outfeed compartments C1 and C2 of airlock units 11a and 11b by conduits 63a and 63b, respectively, which are provided, respectively, with manually operable emergency slide gates 64a and 64b. A variable restriction valve 65 in conveyor duct 63 produces a pressure drop so as to keep a material receiving portion 66 of duct 63 at a lower pressure than is a branch pipe 67 which furnishes air for the aerating systems 29 and 32 of the feeders, and for the backwash air system, indicated generally at 68a and 68b, which provide the air for blowing out the fabric filters in the filter chambers of the feeders. A T connection 69 in branch pipe 67 connects with a pipe 70 from which air is carried to additional sets of airlock feeders to supply the aerating air and backwash air for such additional units.

In addition to the air supply furnished by pressure pneumatic conveyor system 61, the control components also require a high pressure line for valve control operations, illustrated in the drawing in broken lines; and a low pressure air supply system, indicated in the drawings in dot dash lines, for operating the power units 28 and 33 to control the feed orifices of the two airlock feeder units.

Seen at the top of Fig. 2 is a main air supply pipe 71, leading from a compressed air source (not shown) which passes through a shut-off valve 72 and a filter 73 to branch T 74 from which one branch 75 provides the high pressure air line while a second branch 76 passes through a pressure regulating valve 77 to provide air for the lower pressure line 78. Pressure regulating valve 77 is set to maintain a pressure of 15 p.s.i., and the lower pressure line then passes through a pressure relief valve 79 which is set to open at 20 p.s.i.

As previously explained in a general way, when the airlock feeding units 11a and 11b have their orifice control valves in the positions indicated in the drawing, valve power units 28 are not under air pressure, so that their springs keep the infeed orifices closed, while aerating units 29 are providing aerating air for infeed compartments A. Conversely, power units 33 which control the outfeed valves are under air pressure to close the outfeed orifices, while aerating units 32 are inactive. At the same time, the vents 55 from the airlock chambers B must be open to the atmosphere, in order to vent the aerating air from airlock chambers B. As shown in connection with the timer schedule (Fig. 4) all the elements of Figs. 1, 1a and 2, and also the electrical controls of Fig. 3, are in the relative positions shown with the timer at the position indicated in the timer schedule.

The controls of the present system employ combination of air actuated valves, all of which are controlled from high pressure air lines 75, and solenoid valves. Solenoids SAV-1 and SAV-2 of solenoid valves 88 and 96, respectively, are controlled by a synchronous motor 80 acting through timer cams 81 and 82; while a solenoid SAV-5 for a full load regulator valve 98 is controlled by an air pressure switch 85 to stop the feed of material into conveyor system 61 when an excessive feed of material chokes receiving duct 66 and causes a sudden increase in pressure in branch line 67.

The wiring diagram Fig. 3 and the timer schedule Fig. 4 are set up to show the operation of controls for two additional feeders 11, which are in the opposite phase from the feeders 11a and 11b. Accordingly, Fig. 3 shows additional contacts MT-3 and MT-4 for air valve solenoids SAV-3 and SAV-4, which operate the two additional feeders not shown in Fig. 2, and which correspond in function, respectively, to timer contacts MT-1 and MT-2, and are operated by timer cams 83 and 84. Similarly, solenoid SAV-6 for an overload valve for the two additional feeding units is also operated by pressure switch 85.

At the same time that infeed power units 28 are under pressure, so as to open the inlet orifices, infeed aerators 29 must be receiving air and vent pipes 60 must vent to the atmosphere. A normally open two position two connection shut-off valve 86 with an air pilot control is employed for control of air to aerators 29, and a similar valve 87 is employed to vent the pipes 60 to the atmosphere. Pilot controls for valves 86 and 87 are provided by the high pressure air line 75, and since the valves 86 and 87 must be actuated in conjunction with the operation of infeed power units 28, the valve 88 operated by SAV-1 is a two position four connection directional valve which controls flow of low pressure air to a line 89 which has branches 89a and 89b leading, respectively, to the power units 28a and 28b. Valve 88 also controls the flow of high pressure air into a line 90 which has a branch 91 to the air pilot for normally open valve 86 and a second branch 92 to the air pilot for normally open valve 87. As seen in Fig. 2, with SAV-1 energized the valve 88 is open to low pressure line 89, so that the two infeed power units 28 are under pressure and the infeed orifices are open. The valve is closed to line 90, so that air pilots 86a and 87a of the valves 86 and 87, respectively, are not under pressure; and both valves are in their normally open condition. Accordinly, air from branch line 67 off the pneumatic conveyor system is connected through a branch line 93 and normally open valve 86 with an infeed aerating line 94 which has a branch 94a to aerator 29a and a branch 94b to aerator 29b. Each said branch operates through a variable restriction valve, indicated in the drawings as 95a and 95b. Likewise, normally open vent valves 87a and 87b are open to the atmosphere, so as to vent the airlock chambers B1 and B2.

The elements of the airlock feeders 11 which are utilized for feeding material out of airlock chambers B must be in the opposite phase of opertion from the infeed elements of the feeders, and accordingly another two position four connection directional valve 96 is operated by solenoid SAV-2, and this solenoid is de-energized as indicated by the open condition of contacts MT-2 in Fig. 3. Valve 96 has its port for the low pressure line closed, so that no air is entering a line 97 which passes through the full load control valve 98 into a line 99 which has a branch 99a supplying air to power unit 33a and a branch 99b supplying air to power unit 33b. Line 99a is seen to pass through a component assembly 100a which contains a variable restriction valve and a check valve in parallel, and line 99b passes through a similar unit 100b.

Full load regulator valve 98 is a two position three connection valve which is normally open, so that when the control system is in the opposite phase from that illustrated in the drawing air is permitted to pass from line 97 into line 99 in order to place the power units 33a and 33b under pressure and open the outlet orifices. Operation of full load regulator valve 98 is accomplished through pressure relief switch 85 in the circuit for SAV-5, and switch 85 is in a control branch line 101 which has a pressure relief valve 102, a gauge 103 and the pressure switch 85. In the event excessive flow of material into pressure pneumatic conveyor duct 66 causes an increase in pressure in control branch line 101 above a predetermined level, it actuates pressure switch 85 to energize solenoid SAV-5 and close the port to line 97, at the same time exhausting line 99 so that power units 33a and 33b become inactive and their springs close the outfeed orifices of the two airlock feeders. As soon as feed of material by conveyor system 61 has removed enough of the excess material to drop the pressure into a normal range, pressure switch 85 opens, SAV-5 is de-energized, and air is again supplied to power units 33a and 33b to begin feed of material again.

The branch of high pressure air line 75 which enters valve 96 is seen in this phase of the operation to be connected through the valve 96 to supply air under pressure to a line 104 which has a first branch 105 to the air pilot control of a normally open two position two connection shut-off valve 106, and a pair of branches 107a and 107b which are connected to air pilots of normally open backwash air valves 108a and 108b of the backwash units 68a and 68b which are associated with the vent units of the two feeders. Thus, pressure is on the pilot controls of valves 108a and 108b, so that these normally open valves are all closed. Accordingly, air from a branch line 109 of line 93 is prevented from entering an outfeed aerator line 110 which has a branch 110a feeding the aerator 32a and a second branch 110b feeding the aerator 32b. Likewise, backwash air units 68a and 68b are not supplying backwash air to the vent pipes 60a and 60b of the vent systems.

As previously mentioned, when the system is on the opposite phase to that illustrated in Fig. 2 it is necessary to blow air into the airlock chambers B in order to clean filter cloths 57, and also to raise the air pressure within the airlock chamber above that in duct portion 66 of the pressure pneumatic conveyor. Removal of deposited material from the fabric of filter cloth 57 is greatly facilitated if there is a sudden rush of air through the cloth, which snaps it to a position opposite to that shown in Fig. 1a and thus shakes the fine material free of the fabric so that it may be blown back into the airlock chamber. In order to accomplish this, backwash air systems 68a and 68b are provided with pressure tanks numbered, respectively, 111a and 111b, and a branch line 112 from conveyor duct branch 67 supplies air to such tanks through feeder lines 112a and 112b, each of which is provided with a check valve, numbered respectively 113a and 113b. The tanks 111a and 111b are charged with air during the infeed phase of the feeding cycle illustrated in Fig. 2, and the cams driven by synchronous motor 80 are so arranged that cam 82 closes contact MT-2 for SAV-2, in order to operate valve 96, at the same time that cam 81 permits contact MT-1 to open, thus de-energizing SAV-1 and reversing the position of valve 88. Accordingly, as vent valves 87a and 87b close, backwash valves 108a and 108b open, and a surge of air from tanks 111a and 111b flows abruptly through vent lines 60a and 60b to snap the filter cloths to their opposite positions and thus shake the dust from them.

At the same time the backwash air is released for flow into airlock chambers B the simultaneous operation of valves 86 and 106 stops the flow of aerating air to infeed aerators 29 and starts the flow of aerating air to outfeed aerators 32. Likewise, the operation of valve 88 places infeed power units 28 on exhaust through line 89 and an exhaust port of valve 88, while the operation of valve 96 permits air to pass through the line 97, valve 98 and line 99 to supply air to outfeed power units 33.

The remaining electrical control components of the system are illustrated in the wiring diagram, Fig. 3, and include the usual fuses 114 in a box behind knife switches 115, and a blower motor control circuit having a normally open switch controlled by a start push button PB1 and a normally closed switch controlled by a stop button PB2. Pressing button PB1 closes a relay contact M1 of a holding circuit, thus energizing a motor starting relay M1. The usual automatic overload switches OL are provided in the motor control circuit. Closing this circuit also energizes a relay MT for timer motor 80. A pair of pilot lights R are also normally illuminated as long as the system is in operation, and a safety switch SS1 extinguishes one of the two pilot lights when it is opened.

It has been previously stated that if a full cycle of one minute is employed, up to 25 seconds may be used for filling airlock chamber B. The filling time may vary from the maximum of about 25 seconds down to a minimum which may be as low as about six seconds, depending principally upon the character of the material which is fed out of the collector. The cam 82 which closes MT-2 is of the adjustable type so as to vary the period of time that the infeed valve is open to fill chamber B.

To illustrate this fact, the timer schedule, Fig. 4, has a solid bar for the minimum time that contacts MT-1 and MT-3 may be closed, and a cross hatched additional section on each of the bars to illustrate the maximum filling time which may be used, it being understood that adjustable cam 82 may be set to provide a filling time between six seconds and 25 seconds.

The filling time is adjusted in the field, and may be readjusted periodically as the characteristics of the material vary, so that airlock chamber B fills approximately to the center of the window in back panel 14. In this way, the amount of material admitted to chamber B on each fill may be checked periodically to be sure that the load in the chamber does not approach a point where it could clog the infeed orifices and interfere with operation of the infeed valve.

In operation, the feeder units controlled by timer contacts MT-1 and MT-2 are unloading for one half of the full cycle, while the units controlled by time contacts MT-3 and MT-4 are unloading for the other one half of the full cycle. As shown by the timer schedule, the loading time for each pair of units overloaps a portion of the unloading time for the other units.

The foregoing detailed description is given for clearness of understanding only and no unnecessary limitations are to be understood therefrom, as some modifications will be obvious to those skilled in the art.

I claim:

1. Apparatus for feeding pulverulent material comprising: a collector; receiving means at a higher air pressure than the collector; an airlock chamber; first feeding means including first aerating means in the collector for feeding pulverulent material into said airlock chamber; second feeding means including second aerating means within said airlock chamber for feeding material out of the airlock chamber into said receiving means; a vent on said airlock chamber; a filter in said vent; a source of blower air connected to said vent, said source of blower air being controlled to operate only during the operation of said second feeding means for cleaning said filter and adding air to said airlock chamber; and reversible valve means connected to said vent for admitting air to said airlock chamber during the operation of said second feeding means and exhausting after termination of operation of said second feeding means.

2. Apparatus for feeding pulverulent material comprising: a collector; receiving means at a higher air pressure than the collector; first aerating means at the bottom of the collector for fluidizing pulverulent material; an airlock chamber for receiving said fluidized material; controllable inlet means between said first aerating means and said airlock chamber; second aerating means at the bottom of said chamber; controllable outlet means between said chamber and said receiving means; pneumatic means for selectively opening or closing said inlet means or said outlet means; blower means for selectively operating said first or second aerating means; air valve means for controlling said pneumatic means and said blower means to open said inlet means and close said outlet means while said first aerating means is operating, and to open said outlet means and close said inlet means while said second aerating means is operating; an air vent on said airlock chamber, said air vent including a filter and reversible valve means; air supply means connected to said reversible valve means and controlled by said air valve means for supplying air to said air vent during the operation of said second aerating means; and normally open exhaust means in said reversible valve which is closed by the operation of said air supply means whereby air is supplied to said airlock chamber to clean said filter and add air to said chamber during the operation of said second aerating means and air is filtered and exhausted from said airlock chamber at the termination of operation of said second aerating means.

3. Apparatus for feeding pulverulent material comprising: receiving means; an airlock chamber; first feeding means for feeding pulverulent material into said chamber; second feeding means including aerating means within the airlock chamber for feeding material out of the airlock chamber into said receiving means; control means for operating said feeding means alternately; a vent on said airlock chamber; a filter in said vent; means for flowing air through the filter into the chamber during operation of the second feeding means; and means for exhausting air from the chamber through said filter between operations of said second feeding means.

4. Apparatus for feeding pulverulent material comprising: an airlock chamber; aerating means associated with said airlock chamber for facilitating the flow of pulverulent material through said airlock chamber; gate means for controlling the flow of material into and out of said chamber; means to vent air from said chamber, said vent means including a filter compartment; a fabric filter which has its entire margin sealed to the wall of said compartment, said filter having a fullness in its central area; venting means for cyclically flowing air to and from the chamber through the filter in conjunction with the operation of the aerating means and gate means, said means producing an abrupt flow of air through said filter into the chamber, whereby said filter is shaken to dislodge pulverulent material therefrom.

5. The apparatus of claim 4 in which the venting means includes an air compression tank and means for abruptly placing said tank in communication with the filter chamber.

6. Apparatus for feeding pulverulent material, comprising: a collector; pneumatic pressure conveyor means; an airlock chamber having an inlet orifice from said collector and an outlet orifice to said means; means for cyclically filling the chamber with material from the collector for a set filling time at a controlled rate with the outlet orifice closed and for emptying the chamber into the conveyor for a set emptying time at a controlled rate with the inlet orifice closed; and pressure actuated control means communicating with the conveyor, said control means interrupting the emptying cycle without extending said set emptying time when the pressure in the conveyor moves outside a predetermined range due to overloading of the conveyor.

7. The apparatus of claim 6 in which the pressure conveyor includes a blower, the pressure actuated control means is between the blower and the outlet orifice of the chamber, and said control means stops the feed of material when the pressure on it exceeds a predetermined range.

8. Apparatus for feeding pulverulent material, comprising: a collector; receiving means which is at a higher air pressure than said collector; an air lock chamber the upper portion of which has a valve controlled inlet orifice of small area communicating with the collector, and the lower portion of which has a valve controlled outlet orifice of small area communicating with the receiving means, each said orifice permitting controlled flow of material, and said chamber having a capacity such that it can accommodate a predetermined charge of material be'ow the level of said inlet orifice; first aerating means to facilitate the flow of material into the chamber; second aerating means to facilitate the flow of material out of the chamber; control means operating said aerating means and the valve controls of said orifices on a time cycle to fill said chamber at a controlled rate with a charge of material no greater than said predetermined charge, and to thereafter empty said chamber of said charge at a controlled rate; and means for venting said chamber during its filling cycle.

9. The apparatus of claim 8 in which the receiving means is a pneumatic pressure conveyor, and the apparatus includes pressure actuated control means communicating with the conveyor, said control means interrupting the emptying cycle without extending said cycle when the pressure in the conveyor moves outside a predetermined range due to overloading of the conveyor.

10. Apparatus for feeding pulverulent material, comprising: a collector; receiving means which is at a higher air pressure than said collector; an airlock chamber which has upright side walls, said chamber having in the top part of a sidewall a valve controlled inlet orifice of small area communicating with the collector, and having in the bottom part of a sidewall a valve controlled outlet orifice of small area communicating with the receiving means, and said chamber having a capacity such that it can accommodate a predetermined charge of material below said inlet orifice; first aerating means in the bottom of the collector alongside said inlet orifice; second aerating means in the bottom of the chamber alongside said outlet orifice; control means operating said aerating means and the valve controls of said orifices on a time cycle to fill said chamber at a controlled rate with a charge of material no greater than said predetermined charge, and to thereafter empty said chamber of said charge at a controlled rate; and means for venting said chamber during its filling cycle.

11. Apparatus for feeding pulverulent material, comprising: a collector; receiving means which is at a higher air pressure than the collector; an airlock chamber the upper end portion of which communicates with said collector through an inlet orifice of small area and the lower end portion of which communicates with said receiving means through an outlet orifice of small area, each such orifice permitting controlled flow of material; first aerating means at the bottom of the collector to fluidize material for controlled flow through the inlet orifice into the chamber; second aerating means at the bottom of the chamber to fluidize material for controlled flow from the chamber through the outlet orifice; automatic valve means to open and close said orifices; vent means connecting the chamber with a zone the air pressure of which is substantially equal to that in the collector; means for introducing air to the chamber through the vent means at a pressure no less than that of the receiving means; a filter in said vent means; automatic valve means to control air flow outwardly and inwardly through said vent means and filter; and control means operating said first and second aerating means and both said automatic valve means in a continuous cycle which actuates the first aerating means for a set period of time while the inlet orifice is open, the outlet orifice is closed and air is released from the chamber through the vent means and filter, and which thereafter actuates the second aerating means for a set period of time while the outlet orifice is open, the inlet orifice is closed, and air is introduced to the chamber through the vent means and filter.

12. Apparatus for feeding pulverulent material from a collecting means to a receiving means which is spaced below the collecting means, comprising: a rectangular housing; vertical and horizontal partitions dividing the housing into an infeed compartment for receiving material by gravity from the collecting means, an outfeed compartment below the infeed compartment for feeding material by gravity to the receiving means, and an airlock chamber alongside both said compartments, said vertical partitions being provided with an infeed orifice and an outfeed orifice; an aerating floor in the bottom of the infeed compartment to fluidize material for flow through the infeed orifice into the airlock chamber; an aerating floor in the bottom of the airlock chamber to fluidize material for flow through the outfeed orifice into the outfeed compartment; power actuated infeed valve means to open and close the infeed orifice; power actuated outfeed valve means to open and close the outfeed orifice; and a filtered vent in the upper end of said chamber.

13. The apparatus of claim 12 in which the infeed and outfeed valve means each includes a power unit mounted on the outside of the housing, and a valve member inside the housing to open and close the orifice controlled by the valve means, said valve member being operatively connected to the power unit.

14. The apparatus of claim 12 in which the infeed and outfeed valve means each includes a pivoted shaft journalled in a wall of the housing, an arm on said shaft having a valve member to close the orifice controlled by the valve means, a crank arm on the shaft outside the housing, and a power unit mounted on the outside of the housing in operative engagement with said crank arm.

15. The apparatus of claim 12 in which the filtered vent includes a filter chamber, a fabric filter the entire margin of which is secured to the wall of the filter chamber, said filter having a fullness in its central area, and an air pipe on the opposite side of the filter from the airlock chamber.

16. Apparatus for feeding pulverulent material, comprising: a collector; receiving means which is at a higher air pressure than said collector; an airlock chamber which has upright side walls, said chamber having in the top part of a side wall a valve controlled inlet orifice of small area communicating with the collector, and having in its lower end portion a valve controlled outlet orifice of small area communicating with the receiving means, and said chamber having a capacity such that it can accommodate a predetermined charge of material below said inlet orifice; first aerating means in the bottom of the collector alongside said inlet orifice; second aerating means in the bottom of the chamber alongside said outlet orifice; control means operating said aerating means and the valve controls of said orifices on a time cycle to fill said chamber at a controlled rate, and to thereafter empty said chamber at a controlled rate, said control means including a filling control which may be varied to change the filling time within predetermined limits so as to permit adjustment of the apparatus to accommodate it to materials of different flow characteristics; and means for venting said chamber as it is filled.

References Cited in the file of this patent
UNITED STATES PATENTS

| 2,234,788 | Williams | Mar. 11, 1941 |
| 2,565,835 | Adams | Aug. 28, 1951 |
| 2,746,807 | Tolman | May 22, 1956 |
| 2,819,122 | Schneider | Jan. 7, 1958 |
| 2,873,143 | Williams | Feb. 10, 1959 |